(12) United States Patent
Higashiura (10) Patent No.: US 11,198,331 B2
(45) Date of Patent: Dec. 14, 2021

(54) TYRE

(71) Applicant: Sumitomo Rubber Industries, Ltd., Kobe (JP)

(72) Inventor: Kazuki Higashiura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 263 days.

(21) Appl. No.: 16/355,029

(22) Filed: Mar. 15, 2019

(65) Prior Publication Data
US 2019/0308459 A1 Oct. 10, 2019

(30) Foreign Application Priority Data

Apr. 6, 2018 (JP) .............................. JP2018-074052

(51) Int. Cl.
*B60C 11/11* (2006.01)
*B60C 11/03* (2006.01)
*B60C 11/12* (2006.01)
*B60C 11/16* (2006.01)

(52) U.S. Cl.
CPC ........ *B60C 11/0302* (2013.01); *B60C 11/032* (2013.01); *B60C 11/11* (2013.01); *B60C 11/1204* (2013.01); *B60C 11/1236* (2013.01); *B60C 11/1625* (2013.01); *B60C 2011/0372* (2013.01); *B60C 2011/0374* (2013.01);
(Continued)

(58) Field of Classification Search
CPC ..... B60C 2011/0339; B60C 2011/0358; B60C 2011/0374; B60C 11/0306; B60C 11/0309; B60C 11/11; B60C 2011/036; B60C 2011/0372
See application file for complete search history.

(56) References Cited

U.S. PATENT DOCUMENTS

2009/0283189 A1* 11/2009 Mun ................... B60C 11/1218
152/209.18
2015/0191050 A1* 7/2015 Matsumoto ......... B60C 11/1236
152/209.25
2016/0297249 A1* 10/2016 Ishino ................. B60C 11/0302

FOREIGN PATENT DOCUMENTS

DE 102005058365 * 6/2007
EP 2626221 A1 8/2013
EP 3078506 A1 10/2016
(Continued)

OTHER PUBLICATIONS

Machine translation of DE 102005058365, 2007.*
Extended European Search Report, dated Jul. 29, 2019, for European Application No. 19159689.9.

*Primary Examiner* — Justin R Fischer
(74) *Attorney, Agent, or Firm* — Birch, Stewart, Kolasch & Birch, LLP (57) ABSTRACT

A tyre comprises a tread portion comprising a first tread edge and a second tread edge, and the tread portion is provided with a plurality of oblique grooves. The plurality of the oblique grooves includes a first oblique groove and a second oblique groove. Each of the first oblique grooves and the second oblique groove has an open end and a terminating end, and a first steeply-inclined portion positioned on a side of the open end, a second steeply-inclined portion positioned on a side of the terminating end, and a mildly-inclined portion positioned between them. The second steeply-inclined portion includes a part in which an angle thereof with respect to a tyre circumferential direction is gradually decreased as it goes toward the terminating end.

19 Claims, 4 Drawing Sheets

(52) U.S. Cl.
CPC ............ *B60C 2011/1213* (2013.01); *B60C 2011/1254* (2013.01)

(56) References Cited

FOREIGN PATENT DOCUMENTS

| | | | |
|---|---|---|---|
| EP | 3098090 A1 | | 11/2016 |
| JP | 2004-224249 | * | 8/2004 |
| JP | 2016-196288 A | | 11/2016 |
| WO | WO 2014/115052 A1 | | 7/2014 |

* cited by examiner

TYRE

TECHNICAL FIELD

The present invention relates to a tyre, and in particular, to a tyre suitable for running on a snowy road surface.

BACKGROUND ART

Japanese unexamined Patent Publication No. 2016-196288 (Patent Literature 1) has proposed a tyre for winter having a tread portion provided with a plurality of oblique lateral grooves. Each of the oblique lateral grooves extends from outside of a respective one of ground contact edges toward a tyre equator to have an inner end thereof terminating in a vicinity of the tyre equator without crossing it.

SUMMARY OF THE INVENTION

In addition to further improving on-snow performance, improvement of wet performance is also required for the tyre for winter. However, the oblique lateral grooves disclosed in the Patent literature 1 terminate without crossing the tyre equator, therefore, traction and drainage property on a snowy road surface tend to be insufficient.

The present invention was made in view of the above, and a primary object thereof is to provide a tyre capable of exerting excellent on-snow performance and excellent wet performance.

In one aspect of the present invention, a tyre comprises a tread portion comprising a first tread edge and a second tread edge, wherein the tread portion is provided with a plurality of oblique grooves extending obliquely with respect to a tyre axial direction, the plurality of the oblique grooves includes a first oblique groove and a second oblique groove, the first oblique groove has an open end connected with the first tread edge and extends therefrom axially inwardly to cross the tyre equator and to have a terminating end terminating before reaching the second tread edge, the second oblique groove has an open end connected with the second tread edge and extends therefrom axially inwardly to cross the tyre equator and to have a terminating end terminating before reaching the first tread edge, regarding an inclination with respect to the tyre axial direction, each of the first oblique groove and the second oblique groove includes a first steeply-inclined portion positioned on a side of the open end, a second steeply-inclined portion positioned on a side of the terminating end, and a mildly-inclined portion positioned between them, and the second steeply-inclined portion includes a part in which an angle thereof with respect to a tyre circumferential direction is gradually decreased as it goes toward the terminating end.

In another aspect of the invention, it is preferred that the tread portion is provided with a plurality of the first oblique grooves and a plurality of the second oblique grooves, and each of the plurality of the first oblique grooves intersects with two or more oblique grooves between the tyre equator and the second tread edge.

In another aspect of the invention, it is preferred that each of the plurality of the second oblique grooves intersects with two or more oblique grooves between the tyre equator and the first tread edge.

In another aspect of the invention, it is preferred that an angle with respect to the tyre axial direction of the mildly-inclined portion of the or each first oblique groove is gradually decreased as it goes toward the second tread edge.

In another aspect of the invention, it is preferred that an angle with respect to the tyre axial direction of the mildly-inclined portion of the or each second oblique groove is gradually decreased as it goes toward the first tread edge.

In another aspect of the invention, it is preferred that the first steeply-inclined portion is curved so as to be convex toward one side in the tyre circumferential direction.

In another aspect of the invention, it is preferred that the mildly-inclined portion is curved so as to be convex toward the other side in the tyre circumferential direction.

DESCRIPTION OF THE PREFERRED EMBODIMENT

An embodiment of the present invention will now be described below in detail in conjunction with accompanying drawings.

Figure 1:
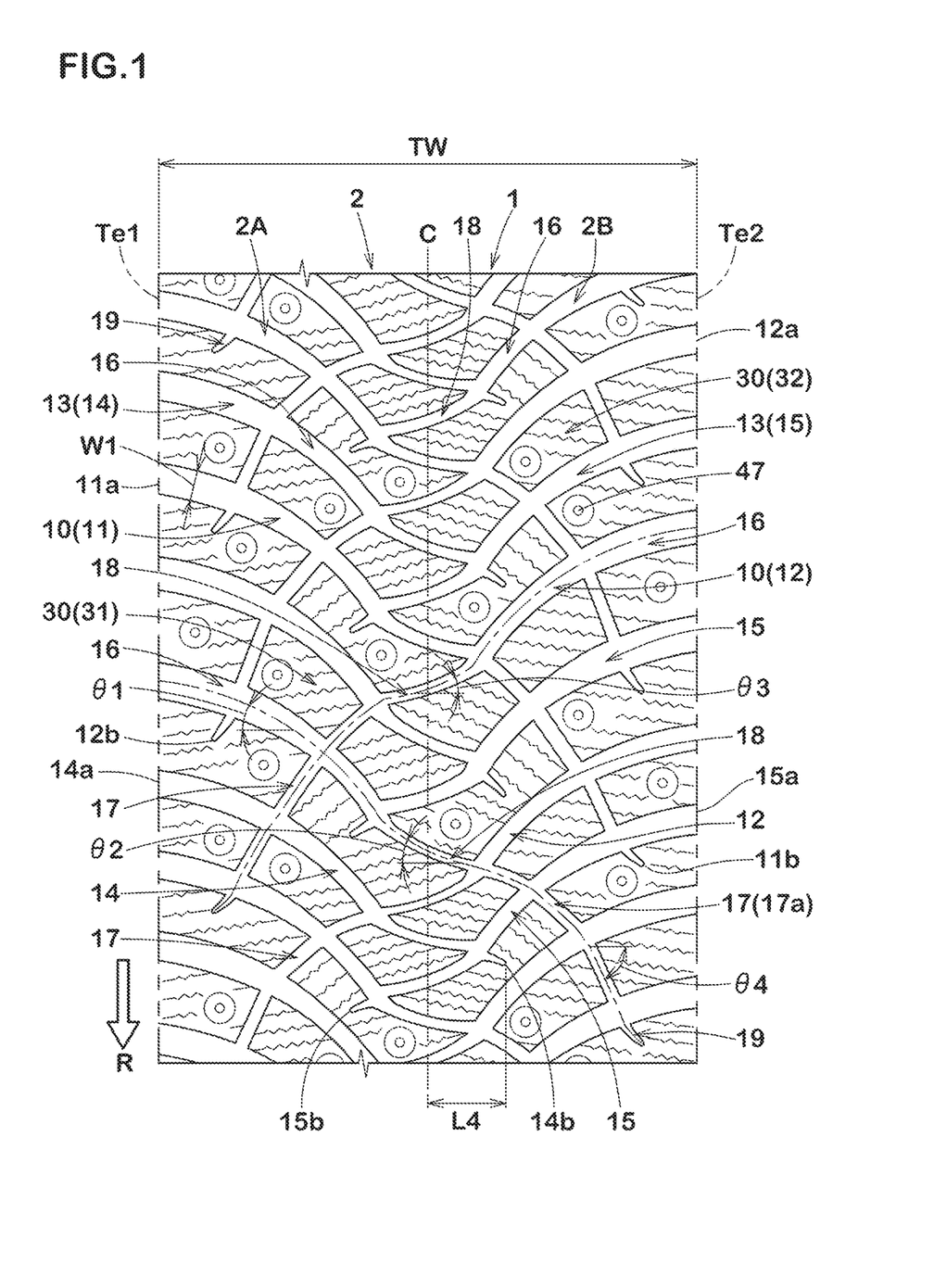
FIG. 1 is a development view of a tread portion of a tyre as an embodiment of the present invention.

FIG. 1 is a development view of a tread portion 2 of a tyre 1 in this embodiment (hereinafter, may be simply referred to as "tyre 1"). As shown in FIG. 1, the tyre 1 in this embodiment is a pneumatic tyre for winter and preferably a tyre for a passenger car, for example. However, the tyre 1 of the present invention is not limited to such an embodiment.

The tyre 1 in this embodiment has a directional pattern bound with an intended tyre rotational direction (R), for example. The tyre rotational direction (R) is indicated by a letter or a symbol on a sidewall portion (not shown), for example.

The tread portion 2 of the tyre 1 in this embodiment includes a first tread edge (Te1) and a second tread edge (Te2). The tread portion 2 includes a first tread portion (2A) positioned between a tyre equator (C) and the first tread edge (Te1) and a second tread portion (2B) positioned between the tyre equator (C) and the second tread edge (Te2), for example. The first tread portion (2A) and the second tread portion (2B) are configured to be substantially line symmetrical except that they are displaced with each other in a tyre circumferential direction. Thereby, each configuration of the first tread portion 2A can be applied to the second tread portion 2B.

In a case of a pneumatic tyre, the first tread edge (Te1) and the second tread edge (Te2) are defined as outermost ground contacting positions in a tyre axial direction when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In this specification, dimensions and the like of various parts of the tyre are those measured under the standard state unless noted otherwise.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of oblique grooves 10 each extending obliquely with respect to the tyre axial direction. The oblique grooves 10 include a plurality of first oblique grooves 11 and a plurality of second oblique grooves 12. Each of the first oblique grooves 11 has an open end (11a) connected with the first tread edge (Te1) and extends therefrom axially inwardly to cross the tyre equator (c) and to have a terminating end (11b) terminating before reaching the second tread edge (Te2). Each of the second oblique grooves 12 has an open end (12a) connected with the second tread edge (Te2) and extends therefrom axially inwardly to cross the tyre equator (C) and to have a terminating end (12b) terminating before reaching the first tread edge (Te1). Each of the second oblique grooves 12 has substantially the same configuration as each of the first oblique grooves 11. Thereby, the configurations of the first oblique grooves 11 can be applied to the second oblique grooves 12 unless noted otherwise. The first oblique grooves 11 and the second oblique grooves 12 each extend so as to cross the tyre equator (C), thereby, high drainage property is exerted during running on a wet road surface, and also snow blocks which are relatively long in the tyre axial direction are formed during running on a snowy road surface, therefore, it is possible that large snow shearing force is provided.

The oblique grooves 10 in this embodiment include oblique sub-grooves 13 each having a length in the tyre axial direction smaller than that of each of the first oblique grooves 11 and the second oblique grooves 12, for example. The oblique sub-grooves 13 include a plurality of first oblique sub-grooves 14 and a plurality of second oblique sub-grooves 15, for example. Each of the first oblique sub-grooves 14 has an open end (14a) connected with the first tread edge (Te1) and extends therefrom axially inwardly to cross the tyre equator (C) and to have a terminating end (14b) which is positioned closer to the tyre equator (C) than each of the terminating ends (11b) of the first oblique grooves 11, for example. In the first tread portion (2A) in this embodiment, the first oblique grooves 11 and the first oblique sub-grooves 14 are arranged alternately in the tyre circumferential direction.

Each of the second oblique sub-grooves 15 has an open end (15a) connected with the second tread edge (Te2) and extends therefrom axially inwardly to cross the tyre equator (C) and to have a terminating end (15b) which is positioned closer to the tyre equator (C) than each of the terminating ends (12b) of the second oblique grooves 12, for example. In the second tread portion (2B) in this embodiment, the second oblique grooves 12 and the second oblique sub-grooves 15 are arranged alternately in the tyre circumferential direction.

In a preferred embodiment, each of the oblique grooves 10 is inclined to a heel side in the tyre rotational direction (R) as it goes from a respective one of the tread edges (Te1) and (Te2) toward the tyre equator (C). However, the present invention is not limited to such an embodiment.

It is preferred that a groove width (W1) of each of the oblique grooves 10 is in a range of from 2.0% to 6.0% of a tread width (TW), for example. It is preferred that the groove width (W1) is decreased gradually and smoothly from a side of the open end to a side of the terminating end, for example. In a case of a pneumatic tyre for a passenger car, a depth of each of the oblique grooves 10 is preferably in a range of from 6.0 to 12.0 mm, more preferably in a range of from 8.0 to 10.0 mm, for example. The tread width (Tw) is a distance in the tyre axial direction between the first tread edge (Te1) and the second tread edge (Te2) of the tyre 1 in the standard state.

Regarding the inclination with respect to the tyre axial direction, each of the first oblique grooves 11 and the second oblique grooves 12 includes a first steeply-inclined portion 16 positioned on the side of the open end, a second steeply-inclined portion 17 positioned on the side of the terminating end, and a mildly-inclined portion 18 positioned between them. Each of the mildly-inclined portions 18 extends at a relatively small angle with respect to the tyre axial direction and receives large ground contact pressure during running straight. Thereby, the mildly-inclined portions 18 provide large on-snow traction during running straight on a snowy road surface.

On the other hand, each of the first steeply-inclined portions 16 and the second steeply-inclined portions 17 extends at a relatively small angle with respect to the tyre circumferential direction and receives large ground contact pressure during cornering. Thereby, the first steeply-inclined portions 16 and the second steeply-inclined portions 17 provide large snow shearing force in the tyre axial direction during running on a snowy road surface, therefore, they are helpful for improving cornering performance on a snowy road surface.

Generally speaking, in a groove portion having a small angle with respect to the tyre axial direction like the mildly-inclined portion, it is difficult for water to flow inside the groove portion, therefore, it is possible that the drainage property is deteriorated. In each of the first oblique grooves 11 and the second oblique grooves 12 of the present invention, the mildly-inclined portion 18 is arranged between the first steeply-inclined portion 16 and the second steeply-inclined portion 17 where water easily flows inside, therefore, it is possible that the on-snow traction is improved while minimizing the deterioration of the drainage property due to the mildly-inclined portion 18.

Further, each of the second steeply-inclined portions 17 includes a part in which the angle thereof with respect to the tyre circumferential direction is gradually decreased toward the terminating end. By the second steeply-inclined portions 17 configured as such, it is possible that water in the oblique grooves 10 is positively guided toward the side of the terminating ends or the side of the open ends by using the rotation of the tyre. Thereby, it is possible that the oblique grooves 10 of the present invention exert excellent drainage property as well.

It is preferred that each of the first oblique grooves 11 intersects with two or more oblique grooves 10 between the tyre equator (C) and the second tread edge (Te2), for example. Each of the first oblique grooves 11 intersects more preferably with three or more, and further preferably with four or more oblique grooves 10 between the tyre equator (C) and the second tread edge (Te2), for example. Thereby, by intersection portions of each of the first oblique grooves 11 with other oblique grooves 10, it is possible that a plurality of snow blocks is formed during running on a snowy road surface, therefore, it is possible that larger snow shearing force is obtained.

From the same point of view, it is preferred that each of the second oblique grooves 12 intersects with two or more oblique grooves 10 between the tyre equator (C) and the first tread edge (Te1), for example. Each of the second oblique grooves 12 intersects more preferably with three or more, and further preferably with four or more oblique grooves 10 between the tyre equator (C) and the first tread edge (Te1), for example.

In this embodiment, all the intersection portions of the oblique grooves 10 are each formed in a crossroad shape, but the present invention is not limited to such an embodiment, and any one of the intersection portions described above may be formed in a three-way path shape.

The first steeply-inclined portion 16 of each of the first oblique grooves 11 extends axially inwardly from the open end (11a) to a position just before the tyre equator (C), for example. Each of the first steeply-inclined portions 16 in this embodiment extends so as to cross a center position in the tyre axial direction of the first tread portion (2A), for example.

An angle (θ1) of each of the first steeply-inclined portions 16 with respect to the tyre axial direction is in a range of from 15 to 70 degrees, for example. The angle of each of the first steeply-inclined portions 16 with respect to the tyre axial direction is gradually and smoothly increased from the side of the open end (11a) to the side of the tyre equator (C), for example. It is preferred that each of the first steeply-inclined portions 16 is curved so as to be convex toward one side in the tyre circumferential direction, for example. Each of the first steeply-inclined portions 16 in this embodiment is curved so as to be convex toward toe-side in the tyre rotational direction (R), for example. Each of the first steeply-inclined portions 16 configured as such forms a snow block curved in a bow shape during running on a snowy road surface. With the snow blocks configured as such, large snow shearing force is exerted toward the heel side in the tyre rotational direction (R), therefore, it is helpful for improving brake performance on a snowy road surface.

Each of the mildly-inclined portions 18 extends so as to cross the tyre equator (c), for example. An end portion on a side of the first tread edge (Te1) of each of the mildly-inclined portions 18 in this embodiment is arranged on the side of the tyre equator (c) of the center position in the tyre axial direction of the first tread portion (2A), for example. Similarly, an end portion on a side of the second tread edge (Te2) of each of the mildly-inclined portions 18 in this embodiment is arranged on the side of the tyre equator (C) of a center position in the tyre axial direction of the second tread portion (2B), for example.

An angle (θ2) with respect to the tyre axial direction of each of the mildly-inclined portions 18 is smaller than a maximum angle with respect to the tyre axial direction of each of the first steeply-inclined portions 16. The angle (θ2) of each of the mildly-inclined portions 18 is in a range of from 5 to 30 degrees, for example. The angle (θ2) with respect to the tyre axial direction of the mildly-inclined portion 18 of each of the first oblique grooves 11 is gradually and smoothly decreased as it goes toward the second tread edge (Te2), for example. Similarly, an angle (θ3) with respect to the tyre axial direction of the mildly-inclined portion 18 of each of the second oblique grooves 12 is gradually and smoothly decreased as it goes toward the first tread edge (Te1). The mildly-inclined portions 18 configured as such make it easy for water entered therein to move to either side in the tyre axial direction during running on a wet road surface.

It is preferred that each of the mildly-inclined portions 18 is curved so as to be convex toward the other side in the tyre circumferential direction, more preferably toward the opposite side to the curve of each of the first steeply-inclined portions 16, for example. Specifically, each of the mildly-inclined portions 18 is curved so as to be convex toward the heel side in the tyre rotational direction (R). The mildly-inclined portions 18 configured as such form snow blocks each curved in a bow shape convex toward the opposite side to the snow blocks formed by the first steeply-inclined portions 16 during running on a snowy road surface, therefore, it is possible that on-snow traction performance is effectively improved eventually.

Each of the second steeply-inclined portions 17 is arranged between the tyre equator (C) and the second tread edge (Te2). Each of the second steeply-inclined portions 17 in this embodiment extends so as to cross the center position in the tyre axial direction of the second tread portion (2B), for example. Each of the second steeply-inclined portions 17 in this embodiment includes a main body portion (17a) and a tip portion 19 connected with the main body portion (17a), for example. An angle of the main body portion (17a) with respect to the tyre circumferential direction is gradually decreased from the mildly-inclined portion 18 to the terminating end (11b), for example. The main body portion (17a) has a length preferably 50% or more, more preferably 70% or more of an entire length of each of the second steeply-inclined portions 17, for example. Further, the main body portion (17a) intersects with at least two oblique grooves 10.

Each of the second steeply-inclined portions 17 is inclined with respect to the tyre axial direction at an angle (θ4) larger than that of each of the mildly-inclined portions 18, for example. The angle (θ4) of each of the second steeply-inclined portions 17 with respect to the tyre axial direction is in a range of from 40 to 70 degrees, for example.

It is preferred that the main body portion (17a) of each of the second steeply-inclined portions 17 is curved so as to be convex to the same direction as each of the first steeply-inclined portions 16, for example. It is possible that the second steeply-inclined portions 17 configured as such provide large snow shearing force in the same direction as the first steeply-inclined portions 16.

It is preferred that an angle with respect to the tyre circumferential direction of the tip portion 19 of each of the second steeply-inclined portions 17 is gradually decreased toward the terminating end (11b), for example.

Figure 2:
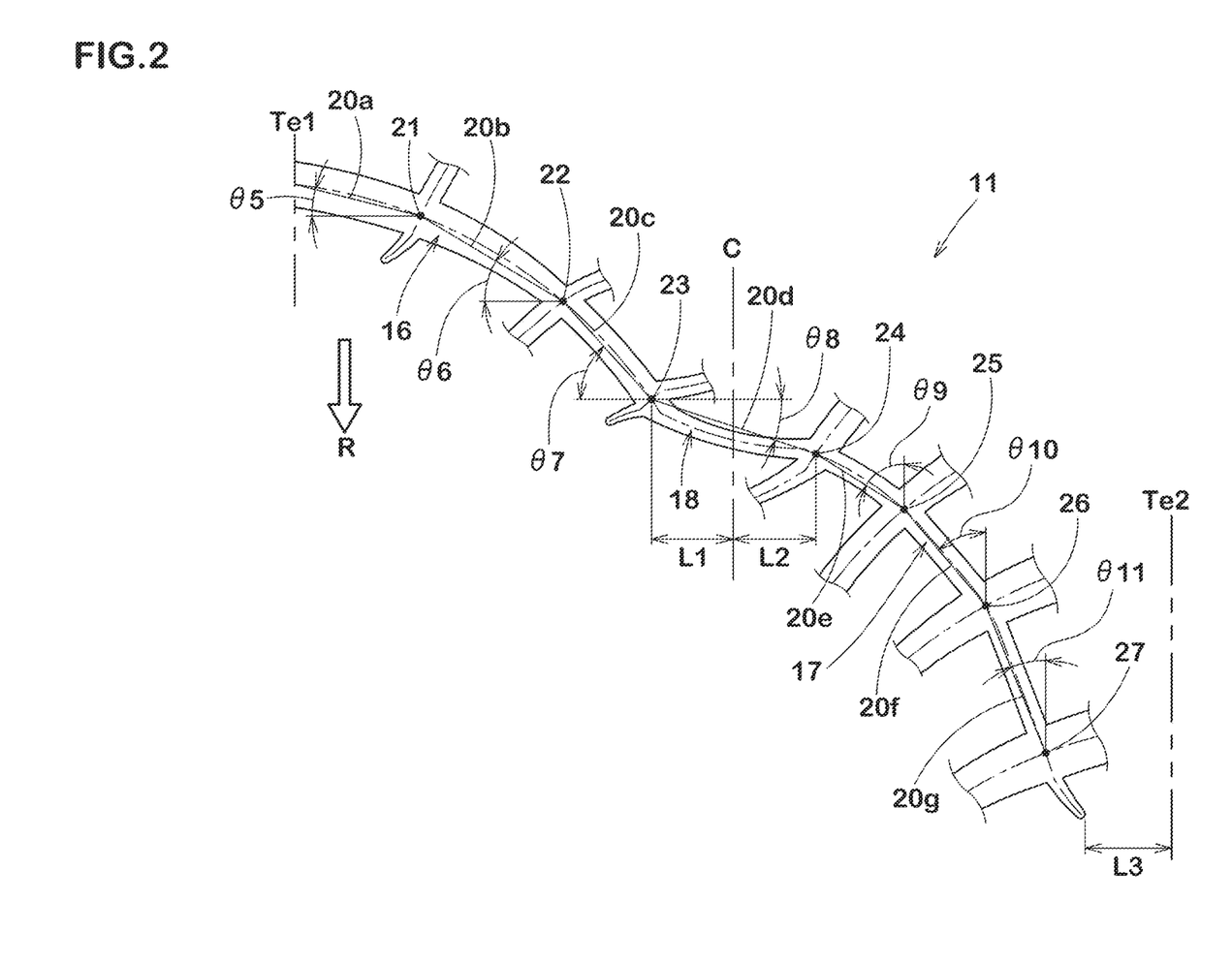
FIG. 2 is an enlarged view of a contour of one of the first oblique grooves of FIG. 1.

FIG. 2 is an enlarged view of a contour of one of the first oblique grooves 11 as a diagram for explaining more detailed configurations of first oblique grooves 11 and the second oblique grooves 12. As shown in FIG. 2, each of the first oblique grooves 11 includes a plurality of the intersection portions with other oblique grooves 10. Each of the intersection portions has an intersection point of a groove center line of the first oblique groove 11 and a groove center line of a respective one of the other oblique grooves 10. Each of the first oblique grooves 11 in this embodiment has three intersection portions in a region between the first tread edge (Te1) and the tyre equator (C), and the intersection points of the intersection portions are a first intersection point 21, a second intersection point 22, and a third intersection point 23. The first intersection point 21 is the intersection point of the intersection portion positioned closest to the first tread edge (Te1). The second intersection point 22 is the intersection point of the intersection portion adjacent to the first intersection point 21 on the side of the second tread edge (Te2). The third intersection point 23 is the intersection point of the intersection portion adjacent to the second intersection point 22 on the side of the second tread edge (Te2).

Each of the first oblique grooves 11 in this embodiment has four intersection portions in a region between the second tread edge (Te2) and the tyre equator (C), and the intersection points of the intersection portions are a fourth intersection point 24, a fifth intersection point 25, and a sixth intersection point 26, and a seventh intersection point 27. The fourth intersection point 24 is the intersection point of the intersection portion positioned adjacent to the third intersection point 23 on the side of the second tread edge (Te2). The fifth intersection point 25 is the intersection point of the intersection portion positioned adjacent to the fourth intersection point 24 on the side of the second tread edge (Te2). The sixth intersection point 26 is the intersection point of the intersection portion positioned adjacent to the fifth intersection point 25 on the side of the second tread edge (Te2). The seventh intersection point 27 is the intersection point of the intersection portion positioned adjacent to the sixth intersection point 26 on the side of the second tread edge (Te2) and positioned closest to the second tread edge (Te2).

The first steeply-inclined portion 16 in this embodiment is formed between the open end (11a) and the third intersection point 23. It is preferred that an angle ($\theta 5$) with respect to the tyre axial direction of a first straight line (20a) is in a range of from 10 to 20 degrees, for example. The first straight line (20a) extends between the first intersection point 21 and an intersection point of the groove center line of the first oblique groove 11 with the first tread edge (Te1). It is preferred that an angle ($\theta 6$) with respect to the tyre axial direction of a second straight line (20b) is in a range of from 20 to 45 degrees, for example. The second straight line (20b) extends between the first intersection point 21 and the second intersection point 22. It is preferred that an angle ($\theta 7$) with respect to the tyre axial direction of a third straight line (20c) is in a range of from 40 to 55 degrees, for example. The third straight line (20c) extends between the second intersection point 22 and the third intersection point 23.

It is preferred that a distance (L1) in the tyre axial direction between the tyre equator (C) and the third intersection point 23 is in a range of from 0.05 to 0.15 times the tread width (Tw), for example. The first oblique grooves 11 configured as such are helpful for improving the on-snow performance and steering stability on a dry road surface in a good balance.

The mildly-inclined portion 18 in this embodiment is formed between the third intersection point 23 and the fourth intersection point 24. It is preferred that an angle ($\theta 8$) with respect to the tyre axial direction of a fourth straight line (20d) is in a range of from 15 to 25 degrees, for example. The fourth straight line (20d) extends between the third intersection point 23 and the fourth intersection point 24.

It is preferred that a distance (L2) in the tyre axial direction between the tyre equator (C) and the fourth intersection point 24 is in a range of from 0.05 to 0.15 times the tread width (Tw), for example.

The second steeply-inclined portion 17 in this embodiment is formed between the fourth intersection point 24 and the seventh intersection point 27. It is preferred that an angle ($\theta 9$) with respect to the tyre axial direction of a fifth straight line (20e) is in a range of from 50 to 60 degrees, for example. The fifth straight line (20e) extends between the fourth intersection point 24 and the fifth intersection point 25. It is preferred that an angle ($\theta 10$) with respect to the tyre axial direction of a sixth straight line (20f) is in a range of from 35 to 50 degrees, for example. The sixth straight line (20f) extends between the fifth intersection point 25 and the sixth intersection point 26. It is preferred that an angle ($\theta 11$) with respect to the tyre axial direction of a seventh straight line (20g) is in a range of from 20 to 30 degrees, for example. The seventh straight line (20g) extends between the sixth intersection point 26 and the seventh intersection point 27.

It is preferred that a distance (L3) in the tyre axial direction between the second tread edge (Te2) and the terminating end (11b) is in a range of from 0.05 to 0.15 times the tread width (Tw), for example. It is possible that the first oblique grooves 11 configured as such improve the on-snow performance and the wet performance while maintaining rigidity in the vicinity of the second tread edge (Te2).

As shown in FIG. 1, like the first oblique grooves 11, each of the first oblique sub-grooves 14 has the first steeply-inclined portion 16 and the mildly-inclined portion 18. The configurations of the first steeply-inclined portion 16 and the mildly-inclined portion 18 of each of the first oblique grooves 11 described above can be applied to the first steeply-inclined portion 16 and the mildly-inclined portion 18 of each of the first oblique sub-grooves 14.

It is preferred that a distance (L4) in the tyre axial direction between the tyre equator (C) and the terminating end (14b) of each of the first oblique sub-grooves 14 is in a range of from 0.30 to 0.40 times the tread width (Tw), for example.

Like the second oblique grooves 12, each of the second oblique sub-grooves 15 has the first steeply-inclined portion 16 and the mildly-inclined portion 18. The configurations of the first steeply-inclined portion 16 and the mildly-inclined portion 18 of each of the second oblique grooves 12 described above can be applied to the first steeply-inclined portion 16 and the mildly-inclined portion 18 of each of the second oblique sub-grooves 15. Further, the first oblique sub-grooves 14 and the second oblique sub-grooves 15 are configured to be substantially line symmetrical except that they are displaced with each other in a tyre circumferential direction. Thereby, the configuration of each of the first oblique sub-groove 14 described above can also be applied to each of the second oblique sub-grooves 15.

By the provision of the oblique grooves 10 and the oblique sub-grooves 13 described above in the tread portion 2, the tread portion 2 includes a plurality of oblique land regions 30 each defined between a pair of the oblique groove 10 and the oblique sub-groove 13 adjacent to each other in the tyre circumferential direction. The oblique land regions 30 include first oblique land regions 31 each connected with the first tread edge (Te1) and second oblique land regions 32 each connected with the second tread edge (Te2). A major part of each of the first oblique land regions 31 is arranged in the first tread portion (2A) and a major part of each of the second oblique land regions 32 is arranged in the second tread portion (2B). Each of the first oblique land regions 31 and each of the second oblique land regions 32 have a substantially line symmetrical shape with respect to the tyre equator (C), therefore, it is possible that the configuration of each of the first oblique land regions 31 is applied to each of the second oblique land regions 32.

Figure 3:
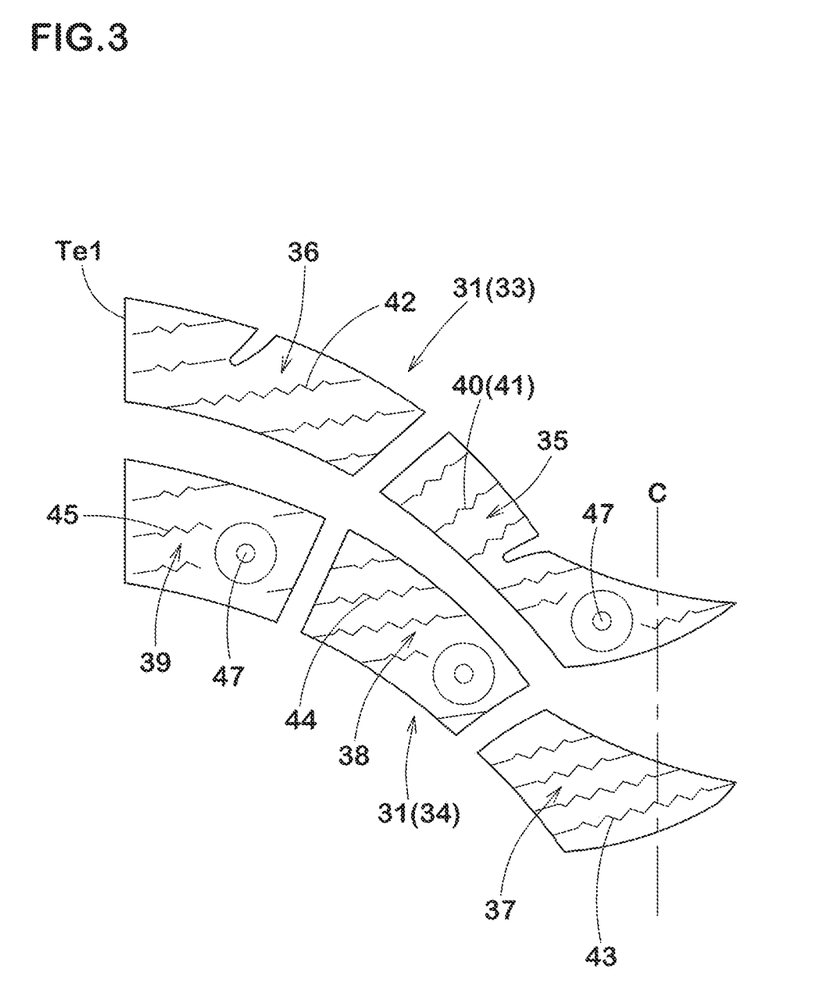
FIG. 3 is an enlarged view of oblique land regions of FIG. 1.

FIG. 3 is a enlarged partial view of the first oblique land regions 31. As shown in FIG. 3, the first oblique land regions 31 include two-divided land regions 33 each constituted by two blocks and three-divided land regions 34 each constituted by three blocks, for example.

Each of the two-divided land regions 33 includes a first block 35 positioned on the side of the tyre equator (C) and a second block 36 positioned on the side of the first tread edge (Te1), for example. The first block 35 is arranged on the tyre equator (C). A part of edges of the second block 36 forms a part of the first tread edge (Te1).

Each of the three-divided land regions 34 includes a third block 37 positioned on the side of the tyre equator (C), a fourth block 38 adjacent to the third block 37 on an outer side in the tyre axial direction, and a fifth block 39 positioned on the side of the first tread edge (Te1), for example. The third block 37 is arranged on the tyre equator (C). A part of edges of the fifth block 39 forms a part of the first tread edge (Te1).

Each of the blocks is provided with sipes 40 each extending in a zigzag manner, for example. Note that the sipe means a cut or a groove having a width of less than 1.5 mm in this specification.

It is preferred that each of first sipes 41 provided in the first block 35 is inclined to a direction opposite to the first oblique grooves 11, for example. It is preferred that each of second sipes 42 provided in the second block 36 is inclined to the same direction as the first sipes 41 and has an angle with respect to the tyre axial direction smaller than that of each of the first sipes 41, for example. It is possible that the first sipes 41 and the second sipes 42 configured as such increase, by edges thereof, frictional force in different directions from that of the first oblique grooves 11.

Each of third sipes 43 provided in the third block 37 is inclined to the same direction as the first sipes 41, for example. It is preferred that each of the third sipes 43 extends at an angle smaller than each of the first sipes 41 with respect to the tyre axial direction.

It is preferred that each of fourth sipes 44 provided in the fourth block 38 and each of fifth sipes 45 provided in the fifth block 39 are inclined to the same direction as the second sipes 42, for example. The fourth sipes 44 and the fifth sipes 45 in this embodiment extend in a direction along a direction in which the second sipes 42 extend, for example.

As shown in FIG. 1, it is preferred that the tyre 1 in this embodiment is a stud tyre provided with a plurality of stud pins or stud pin holes 47, for example. The stud tyre configured as such effectively improves running performance on an icy road surface in particular. However, the tyre 1 of the present invention is not limited to such an embodiment, and it may be used as a studless tyre not including a stud pin.

It is preferred that no grooves and sipes are arranged in a region within 8 mm from each of the stud pin holes 47. Thereby, cracks around the stud pin holes 47 are suppressed.

It is preferred that a land ratio (Lr) of the tread portion 2 in this embodiment is in a range of from 55% to 70%, for example. Thereby, the steering stability on a dry road surface and the on-snow performance are improved in a good balance. In this specification, the term "land ratio" means a ratio Sb/Sa of a total area (Sa) of an imaginary ground contacting surface obtained by filling all the grooves and the sipes and the actual total ground contacting area (Sb).

From the similar point of view, it is preferred that rubber hardness (Ht) of a tread rubber forming the tread portion 2 is in a range of from 45 to 65 degrees, for example. In this specification, the term "rubber hardness" means hardness measured by a type-A durometer according to Japanese Industrial standard JIS-K 6253 under an environment of 23 degrees Celsius.

While detailed description has been made of an embodiment of the present invention, the present invention can be embodied in various forms without being limited to the illustrated embodiment.

WORKING EXAMPLES (EXAMPLES)

Figure 4:
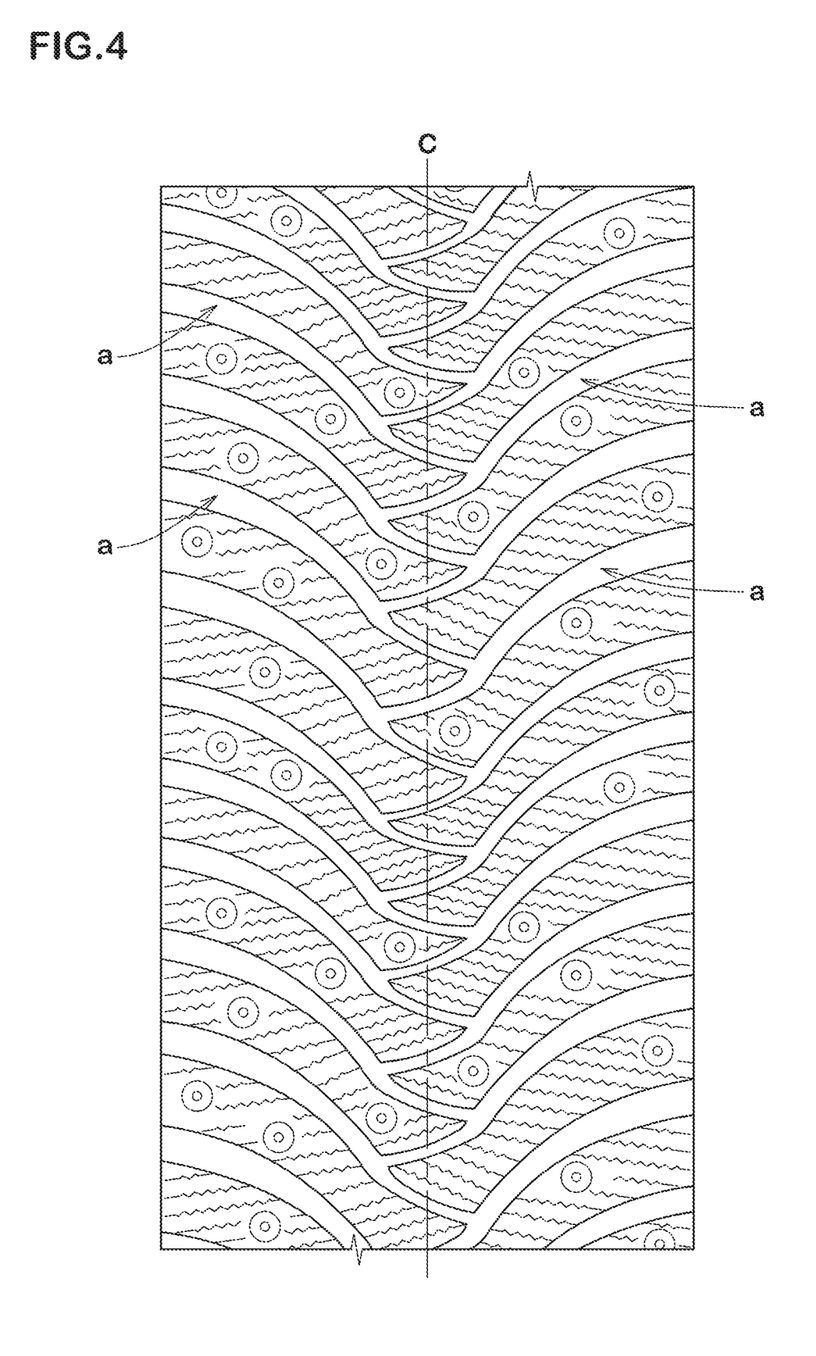
FIG. 4 is a development view of the tread portion of a tyre as Reference.

Pneumatic tyres of size 205/55R16 having the basic tread pattern shown in FIG. 1 were made by way of test according to the specification listed in Table 1. As Reference, as shown in FIG. 4, tyres in which each of oblique grooves (a) does not include the second steeply-inclined portion were made by way of test. Each of the test tyres was tested for the on-snow performance, the wet performance, and the steering stability on a dry road surface. Common specifications of the test tyres and the test methods were as follows.

Test car: displacement of 2000 cc
Test tyre mounting position: all wheels
Tyre rim: 16×6.5
Tyre inner pressure: 240 kPa at front wheels, 220 kPa at rear wheels
Tread ground contacting width: 172 mm
Groove depth of oblique groove: 9.6 mm
Rubber hardness of tread rubber: 55 degrees <On-Snow Performance>

While a driver was drove the test car on a snowy road surface, the running performance was evaluated by the driver's feeling. The results are indicated by an evaluation point based on the Reference being 100, wherein the larger the numerical value, the better the on-snow performance is.

<Wet Performance>

While driving the above test car on an asphalt road surface having a radius of 100 meters with a paddle having a depth of 5 mm and a length of 20 meters, lateral acceleration (lateral G) of the front wheels was measured. The results are shown as average lateral G at a speed in the range of from 50 to 100 km/h and indicated as an index based on the value of the Reference being 100, wherein the larger the numerical value, the better the wet performance is.

<Steering Stability on a Dry Road Surface>

While the driver drove the test car on a dry road surface of a circuit course, the steering stability was evaluated by the driver's feeling.

The results are indicated by an evaluation point based on the Reference being 100, wherein the larger the numerical value, the better the steering stability on a dry road surface is.

The test results are shown in Table 1.

TABLE 1

|  | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Figure showing tread pattern | FIG. 4 | FIG. 1 | FIG. 1 | FIG. 1 | FIG. 1 | FIG. 1 | FIG. 1 | FIG. 1 | FIG. 1 |
| Angle ($\theta 6$) of Second straight line of First steeply-inclined portion [degree] | 35 | 35 | 35 | 35 | 35 | 35 | 30 | 35 | 40 |
| Angle ($\theta 8$) of Fourth straight line of Mildly-inclined portion [degree] | 20 | 25 | 20 | 20 | 20 | 20 | 18 | 20 | 20 |
| Angle ($\theta 9$) of Fifth straight line of Second steeply-inclined portion [degree] | — | 43 | 20 | 28 | 35 | 50 | 43 | 43 | 43 |

TABLE 1-continued

|  | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Angle (θ10) of Sixth straight line of Second steeply-inclined portion [degree] | — | 40 | 15 | 20 | 28 | 45 | 40 | 40 | 40 |
| Angle (θ11) of Seventh straight line of Second steeply-inclined portion [degree] | — | 37 | 10 | 17 | 25 | 40 | 37 | 37 | 37 |
| On-snow performance [evaluation point] | 100 | 108 | 107 | 107 | 108 | 107 | 108 | 108 | 106 |
| Wet performance [index] | 100 | 107 | 108 | 107 | 107 | 105 | 106 | 107 | 107 |
| Steering stability on a dry road surface [evaluation point] | 100 | 97 | 96 | 97 | 97 | 97 | 96 | 97 | 97 |

From the test results, it was confirmed that the tyres as Examples exerted excellent on-snow performance and excellent wet performance. Further, it was confirmed that the steering stability on a dry road surface was also maintained for the tyres as Examples.

The invention claimed is:

1. A tyre comprising a tread portion comprising a first tread edge and a second tread edge, wherein
the tread portion is provided with a plurality of oblique grooves extending obliquely with respect to a tyre axial direction,
the plurality of the oblique grooves includes a first oblique groove and a second oblique groove,
the first oblique groove has an open end connected with the first tread edge and extends therefrom axially inwardly to cross the tyre equator and to have a terminating end terminating before reaching the second tread edge,
the second oblique groove has an open end connected with the second tread edge and extends therefrom axially inwardly to cross the tyre equator and to have a terminating end terminating before reaching the first tread edge,
regarding an inclination with respect to the tyre axial direction, each of the first oblique groove and the second oblique groove includes a first steeply-inclined portion positioned on a side of the open end, a second steeply-inclined portion positioned on a side of the terminating end, and a mildly-inclined portion positioned between them,
the second steeply-inclined portion includes a part in which an angle thereof with respect to a tyre circumferential direction is gradually decreased as it goes toward the terminating end,
the tread portion includes a plurality of oblique land regions divided by the plurality of oblique grooves,
the plurality of oblique land regions include first oblique land regions each connected with the first tread edge and divided into blocks by the plurality of oblique grooves,
each of the first oblique land regions is provided with sipes each inclined in a direction opposite to an inclination direction of the first oblique groove with respect to the tyre axial direction,
the first oblique land regions include:
a two-divided land region constituted by a first block positioned on a side of the tyre equator, and a second block positioned on a side of the first tread edge; and
a three-divided land region constituted by a third block positioned on the side of the tyre equator, a fourth block adjacent to the third block on an outer side in the tyre axial direction, and a fifth block positioned on the side of the first tread edge,
an angle with respect to the tyre axial direction of each of the sipes provided in the second block is smaller than that of each of the sipes provided in the first block, and
an angle with respect to the tyre axial direction of each of the sipes provided in the third block, the fourth block, and the fifth block is smaller than that of each of the sipes provided in the first block.

2. The tyre according to claim 1, wherein
the tread portion is provided with a plurality of the first oblique grooves and a plurality of the second oblique grooves, and
each of the plurality of the first oblique grooves intersects with two or more oblique grooves between the tyre equator and the second tread edge.

3. The tyre according to claim 1, wherein
an angle with respect to the tyre axial direction of the mildly-inclined portion of the or each first oblique groove is gradually and continuously decreased as it goes toward the second tread edge.

4. The tyre according to claim 1, wherein
the first steeply-inclined portion is curved so as to be convex toward one side in the tyre circumferential direction.

5. The tyre according to claim 4, wherein
the mildly-inclined portion is curved so as to be convex toward the other side in the tyre circumferential direction.

6. The tyre according to claim 1, wherein a distance (L3) in the tyre axial direction between the second tread edge and the terminating end of the first oblique groove is in a range of from 0.05 to 0.15 times a tread width.

7. A tyre comprising a tread portion comprising a first tread edge and a second tread edge, wherein
the tread portion is provided with a plurality of oblique grooves extending obliquely with respect to a tyre axial direction,
the plurality of the oblique grooves includes a first oblique groove and a second oblique groove,
the first oblique groove has an open end connected with the first tread edge and extends therefrom axially inwardly to cross the tyre equator and to have a terminating end terminating before reaching the second tread edge,
the second oblique groove has an open end connected with the second tread edge and extends therefrom axially inwardly to cross the tyre equator and to have a terminating end terminating before reaching the first tread edge,
regarding an inclination with respect to the tyre axial direction, each of the first oblique groove and the second oblique groove includes a first steeply-inclined portion positioned on a side of the open end, a second steeply-inclined portion positioned on a side of the terminating end, and a mildly-inclined portion positioned between them, the second steeply-inclined portion includes a part in which an angle thereof with respect to a tyre circumferential direction is gradually and continuously decreased as it goes toward the terminating end, the tread portion is provided with a plurality of the first oblique grooves and a plurality of the second oblique grooves, each of the plurality of the first oblique grooves intersects with two or more oblique grooves between the tyre equator and the second tread edge, the first steeply-inclined portion is curved so as to be convex toward one side in the tyre circumferential direction, and the mildly-inclined portion is curved so as to be convex toward the other side in the tyre circumferential direction.

8. The tyre according to claim 7, wherein each of the plurality of the second oblique grooves intersects with two or more oblique grooves between the tyre equator and the first tread edge.

9. The tyre according to claim 7, wherein an angle with respect to the tyre axial direction of the mildly-inclined portion of the or each first oblique groove is gradually decreased as it goes toward the second tread edge, and an angle with respect to the tyre axial direction of the mildly-inclined portion of the or each second oblique groove is gradually decreased as it goes toward the first tread edge.

10. The tyre according to claim 7, wherein an angle of the first steeply-inclined portion with respect to the tyre axial direction is in a range of from 15 to 70 degrees.

11. The tyre according to claim 7, wherein an angle with respect to the tyre axial direction of the mildly-inclined portion is smaller than a maximum angle with respect to the tyre axial direction of the first steeply-inclined portion.

12. The tyre according to claim 7, wherein the angle of the mildly-inclined portion is in a range of from 5 to 30 degrees.

13. The tyre according to claim 7, wherein the second steeply-inclined portion includes a main body portion and a tip portion connected with the main body portion, and a length of the main body portion is 50% or more of a length of the entire second steeply-inclined portion.

14. The tyre according to claim 13, wherein the length of the main body portion is 70% or more of the length of the entire second steeply-inclined portion.

15. The tyre according to claim 7, wherein a distance (L3) in the tyre axial direction between the second tread edge and the terminating end of the first oblique groove is in a range of from 0.05 to 0.15 times a tread width.

16. A tyre comprising a tread portion comprising a first tread edge and a second tread edge, wherein the tread portion is provided with a plurality of oblique grooves each extending obliquely with respect to a tyre axial direction from the first tread edge or the second tread edge to cross a tyre equator, the plurality of the oblique grooves includes a first oblique groove and a second oblique groove, the first oblique groove has an open end connected with the first tread edge and extends therefrom axially inwardly to cross the tyre equator and to have a terminating end terminating before reaching the second tread edge, the second oblique groove has an open end connected with the second tread edge and extends therefrom axially inwardly to cross the tyre equator and to have a terminating end terminating before reaching the first tread edge, regarding an inclination with respect to the tyre axial direction, each of the first oblique groove and the second oblique groove includes a first steeply-inclined portion positioned on a side of the open end, a second steeply-inclined portion positioned on a side of the terminating end, and a mildly-inclined portion positioned between them, the second steeply-inclined portion includes a part in which an angle thereof with respect to a tyre circumferential direction is gradually and continuously decreased as it goes toward the terminating end, the tread portion is provided with a plurality of the first oblique grooves and a plurality of the second oblique grooves, each of the plurality of the first oblique grooves intersects with two or more oblique grooves between the tyre equator and the second tread edge, and an angle with respect to the tyre axial direction of the mildly-inclined portion of the or each first oblique groove is gradually and continuously decreased as it goes toward the second tread edge.

17. The tyre according to claim 16, wherein each of the plurality of the second oblique grooves intersects with two or more oblique grooves between the tyre equator and the first tread edge.

18. The tyre according to claim 16, wherein an angle of the first steeply-inclined portion with respect to the tyre axial direction is in a range of from 15 to 70 degrees.

19. The tyre according to claim 16, wherein a distance (L3) in the tyre axial direction between the second tread edge and the terminating end of the first oblique groove is in a range of from 0.05 to 0.15 times a tread width.

* * * * *